(12) United States Patent
Richter et al.

(10) Patent No.: US 8,241,429 B2
(45) Date of Patent: Aug. 14, 2012

(54) REMOVAL OF AROMATIC HYDROCARBONS FROM COKE-OVEN GAS BY ABSORPTION

(75) Inventors: Diethmar Richter, Berlin (DE); Holger Thielert, Dortmund (DE); Guenter Wozny, Gliencke (DE)

(73) Assignee: UHDE GmbH, Dortmund (DE)

( * ) Notice: Subject to any disclaimer, the term of this patent is extended or adjusted under 35 U.S.C. 154(b) by 0 days.

(21) Appl. No.: 12/664,906

(22) PCT Filed: Jun. 27, 2008

(86) PCT No.: PCT/EP2008/005253
§ 371 (c)(1),
(2), (4) Date: Apr. 12, 2010

(87) PCT Pub. No.: WO2009/003644
PCT Pub. Date: Jan. 8, 2009

(65) Prior Publication Data
US 2010/0294312 A1    Nov. 25, 2010

(30) Foreign Application Priority Data
Jun. 29, 2007   (DE) .......................... 10 2007 030 367

(51) Int. Cl.
*B08B 5/00*   (2006.01)
*B00B 7/04*   (2006.01)
*B00B 7/00*   (2006.01)

(52) U.S. Cl. ................. 134/11; 134/10; 134/31; 134/19

(58) Field of Classification Search .................... 134/11, 134/22.15, 31, 40, 19, 10, 22, 15, 42
See application file for complete search history.

(56) References Cited

U.S. PATENT DOCUMENTS
1,731,716 A * 10/1929 Fischer, Jr. et al. ............. 562/33
3,312,749 A *  4/1967 Hess et al. ..................... 585/838

FOREIGN PATENT DOCUMENTS
JP        5163384      *  6/1976

OTHER PUBLICATIONS

Kuz'mina E. Ya. "New Petroleum Wash Oil Recover Crude Benzol." Coke and Chemistry U.S.S.R. No. 12, 1987: 45-49.*

* cited by examiner

*Primary Examiner* — Michael Kornakov
*Assistant Examiner* — Arlyn I Rivera-Cordero
(74) *Attorney, Agent, or Firm* — Jonathan Myers; Andrew Wilford

(57) ABSTRACT

The invention relates to a method of removing aromatic hydrocarbons from coke-oven gas. The coke-oven gas is contacted with a wash liquid in a gas scrubber, and aromatic hydrocarbons are separated by absorption from the coke-oven gas. Subsequently the wash liquid enriched with aromatic hydrocarbons is heated, and the aromatic hydrocarbons are stripped from the wash liquid using water vapor. After cooling the wash liquid is finally returned to the gas scrubber. According to the invention biodiesel is used as the wash liquid.

6 Claims, No Drawings

REMOVAL OF AROMATIC HYDROCARBONS FROM COKE-OVEN GAS BY ABSORPTION

CROSS REFERENCE TO RELATED APPLICATIONS

This application is the US national phase of PCT application PCT/EP2008/005253, filed 27 Jun. 2008, published 8 Jan. 2009 as WO2009/003644, and claiming the priority of German patent application 102007030367.1 itself filed 29 Jun. 2007, whose entire disclosures are herewith incorporated by reference.

FIELD OF THE INVENTION

The invention relates to a method of removing aromatic hydrocarbons from coke-oven gas. The coke-oven gas is contacted with a wash liquid in a gas scrubber, and aromatic hydrocarbons are separated by absorption from the coke-oven gas. The wash liquid enriched with aromatic hydrocarbons is subsequently heated, and the aromatic hydrocarbons are stripped from the wash liquid using water vapor. After cooling the wash liquid is finally returned to the gas scrubber.

BACKGROUND OF THE INVENTION

When coking coal, aromatic hydrocarbons are released as a component of the coke-oven gas created. In order to be able to exploit the aromatic hydrocarbons, and not to release them into the environment, they are usually washed out of the coke-oven gas during processing of the coke-oven gas mostly after the separation of tar and ammonia. In practice, a wash oil that is mainly a tar oil fraction is used as the wash liquid, which is created by the processing of black coal. According to the main aromatic hydrocarbons, benzene, toluene, and xylene contained therein, the process step is generally also called BTX or benzene washing. The aromatic hydrocarbons are also called raw benzene, the part of raw benzene being typically between 20 and 40 grams per normal cubic meter ($Nm^3$) depending on the coal and process control used for the coking process. The raw benzene typically has between 55 to 75% benzene, 13 to 19% toluene, and between 5 to 10% xylene. Furthermore, the coke-oven gas also has multicyclic aromatic hydrocarbons, such as particularly naphthalene, which may be absorbed by the wash oil. Furthermore, the coke-oven gas contains contaminations, particularly $H_2S$, HCN, $NH_3$, and organic sulfur compounds. A typical composition of a coke-oven gas, for example, comprises the following:

$H_2$ 54 to 62% by volume
$CH_4$ 23 to 28% by volume
CO 6.2 to 8% by volume
$H_2S$ approximately 1.5 $g/Nm^3$
HCN approximately 1.5 $g/Nm^3$
$NH_3$ 7 $g/Nm^3$
$S_{ORG}$ approximately 0.5 $g/Nm^3$
BTX up to 40 $g/Nm^3$
naphthalene up to 2 $g/Nm^3$ The methods for BTX washing, with regard to main features, have been used in an unchanged manner for decades, and are described, for example, in the technical literature of O. Grosskinsky, "Handbook of Cookery," volume 2, edition 1958, pages 137ff. BTX washing is carried out in one or more successively arranged washers, intimate contact between the coke-oven gas and wash oil as the wash liquid being ensured for the absorption of the aromatic hydrocarbons by the wash oil. Intimate contact can be achieved both by a fine atomization of the wash oil and by thin oil films. The combination of an irrigation system, as well as of cookers, filling bodies, or other installed equipment is particularly advantageous, the oil droplets coming from the irrigation system being spread into an oil film having a surface that is as large as possible. The solubility of benzene, toluene, and xylene is particularly dependent on the vapor pressure of the various components, which is why the wash oil is supplied to the scrubber at comparatively low temperatures, preferably approximately room temperature. On the other hand the wash oil must also have sufficient flowability and low viscosity so that it easy to atomize and may form a large surface. The wash oil enriched with aromatic hydrocarbons collecting at the bottom of the scrubber is removed, the raw benzene being subsequently stripped from the wash oil with high-temperature water-vapor stripping. After cooling the wash oil is then returned to the scrubber. In order to achieve extensive washout of raw benzene with a coke-oven gas flow that is as large as possible, the wash oil is fed to the scrubber in excess. In order to be able to carry out BTX washing with the amounts of coke-oven gas occurring in modern coke ovens, large amounts of wash oil are necessary.

By way of trial, fossil diesel oil may also be used as a wash liquid. However, for this purpose it has been found that sticky residues and a rubber-like consistency occur in the wash oil and are precipitated during the stripping using water vapor at the process temperature. The residues result from the copolymerization reactions in which the contaminations contained in the coke-oven gas, particularly HCN and $H_2S$ as complexing agents are involved. In order to separate the sticky, rubber-like precipitations centrifuges must be provided in the washing fluid cycle. It is further necessary to discharge a relatively large partial flow of the wash liquid from the cycle, and replace it with fresh wash liquid, if fossil diesel oil is used as the wash liquid. The residues separated by the centrifuge and the fossil diesel oil discharged from the cycle must be disposed of. The measures described are extensive, and make the process more cost-intensive. The complex reactions are temperature dependent. With the high temperatures of over 120° C. that are necessary in order to be able to economically operate the regeneration of the wash liquid by vapor stripping, the amount of sticky residues occurring is so large that the process can no longer be operated.

OBJECT OF THE INVENTION

In this regard the invention object of the invention is to improve the absorption of aromatic hydrocarbons from coke-oven gas during BTX washing. The invention aims in particular at rendering the wash liquid used easier to handle and regenerative by stripping using water vapor at high temperatures without any problems.

SUMMARY OF THE INVENTION

Based on a method having the features described above, the problem is solved by the invention in that biodiesel is used as the wash liquid. Within the scope of the invention the term "biodiesel" refers to an organic fuel that is obtained not from fossil crude oil like fossil diesel oil, but instead from plant oils.

The main component of biodiesel is fatty acid methyl ester (FAME). Biodiesel is obtained from plant oils by transesterification, and is available in large cost-effective amounts. As compared to fossil oils and fuels, biodiesel is characterized in that it contains almost no sulfur and gas only a small content of additional contaminants. It was surprisingly found that biodiesel can be regenerated without any problems after absorption of aromatic hydrocarbons at high temperatures, particularly at temperatures above 150° C., by stripping using superheated water vapor, and that contrary to the use of fossil diesel oils no precipitation of sticky, rubber-like substances occurs. Furthermore, biodiesel is biodegradable to a large extent, and has an improved $CO_2$ balance. Due to the lower environmental risks, biodiesel may also be transported and stored without any problems, the disposal efforts being also reduced with the substitution of biodiesel as the wash liquid for BTX washing as compared to the known black coal/tar wash oil.

The composition and the chemical and physical properties of biodiesel are described, for example, in DIN Standard EN14214 (November 2003) and ASTM D 6751-07A. The standards refer to the use of biodiesel as a fuel. In this regard variations of biodiesel may also be used in addition to the standard types of biodiesel for the use of biodiesel for the absorption of aromatic hydrocarbons, which may deviate from the stated standard to a certain degree.

Biodiesel is particularly characterized by a very good absorption capacity with regard to benzene, toluene, and xylene for the low temperatures aimed for in carrying out BTX washing. The coke-oven gas is contacted with the biodiesel in a gas scrubber, the aromatic hydrocarbons being absorbed into the biodiesel from the coke-oven gas. Biodiesel is advantageously added to the top of the scrubber, and flows through the scrubber countercurrent to the coke-oven gas. The biodiesel enriched with the aromatic hydrocarbons is removed in a lower area of the scrubber. Within the scope of the invention the biodiesel is usually added to the scrubber at a temperature of between 10° C. and 50° C., preferably between 20° C. and 40° C., and particularly preferred at approximately 30° C. The washing-out of the raw benzene using the wash liquid is a physical action, the distribution of the material amount of the BTX components on the gas and liquid phase, and thus the absorption thereof, resulting from a balanced state. Simplified, the following applies to the phase balance relation:

$$y_i * \phi_i * p = x_i * \gamma_i * p^{LV}_{Oi}$$

For this purpose $y_i$ and $x_i$ represent the mol fraction of the viewed components i in the gas and the liquid phase, and p represents the system pressure. The vapor pressure $p^{LV}_{Oi}$ is a material property of the viewed component i, which depends on the temperature. In order to be able to describe ideal behaviors, the fugacity coefficient $\phi_i$ in the gas phase, which usually deviates only slightly from 1, and the activity coefficient $\gamma_i$ are used in the liquid phase. The activity coefficient $\gamma_i$ is a variable, which definitively described the behavior of the various molecules toward each other, and is therefore a function both of the composition in the liquid and of the temperature. In order to ensure an absorption that is as effective as possible, $\gamma_i$ values of approximately 1 or below 1 are desired as this corresponds to an increase of the absorption capacity as compared to the ideal behavior. Surprisingly, activity coefficients lower than those of conventional wash oils based on tar oil, and thus a significantly improved absorption capacity was observed in biodiesel as the wash liquid, particularly at low temperatures of about 30° C. Compared to conventional BTX washing using fossil wash oil based on a tar oil fraction, the wash liquid amount to be promoted in the wash liquid cycle can therefore be reduced and the operating costs lowered. Furthermore, raw benzene can also be washed out of the coke-oven gas at a greater amount due to the higher absorption capacity.

In addition to the phase balance, the density, the specific heat capacity, and the viscosity of the wash liquid are also of key importance for the absorption of aromatic hydrocarbons from coke-oven gas by a wash liquid. For example, biodiesel has a higher heat capacity than the known fossil wash oil. Since the heating of the wash liquid leads to a reduction of the absorption capacity in the scrubber, advantages can be obtained from biodiesel. While the density of biodiesel is usually lower than the density of wash oil, the viscosity values are approximately the same.

For regeneration, the biodiesel enriched with aromatic hydrocarbons is heated to a temperature of between 100° C. and 250° C. The stated temperature range is above the boiling points of benzene, toluene, and xylenes such that they separate from the wash liquid. Stripping of the raw benzene using water vapor has proven particularly effective. Neither noteworthy evaporation nor any decomposition of the biodiesel was observed within the stated temperature range. Thermal decomposition and boiling of the biodiesel usually occur as a function of the exact composition only at temperatures above 300° C.

Preferably, the biodiesel is stripped of absorbed aromatic hydrocarbons using superheated water vapor having a temperature of more than 150° C. A temperature of about 180° C. or more is particularly preferred for the stripping. Surprisingly, even at high stripping temperatures no precipitations of any substances were the resulting from copolymerization reactions in contaminants contained in the coke-oven gas. In trial the biodiesel was heated to a temperature of 200° C. and enriched with raw benzene BTX, e.g. benzene, toluene, and xylene according to the composition comprised in the coke-oven gas, as well as with $H_2S$ that promotes the formation of precipitations by copolymerization reactions in fossil diesel oil. While spherical particles were formed in a comparative trial using fossil diesel oil, which deposited on the bottom of the vessel, no precipitants were observed with the use of biodiesel.

Biodiesel is obtained from plant oil. Depending on local conditions, typical raw materials are, for example, rapeseed, palm, sunflower, and soy bean oils, from which the respective methyl esters are formed. Within the course of the invention rapeseed oil methyl ester (RME) is particularly well suited, which may be produced at large amounts in regions having a moderate climate, and which is commercially available.

The invention is explained in further detail based on an example. In order to compare biodiesel and a conventional wash oil as the wash liquid in BTX washing, the properties of black coal-tar wash oil and rapeseed oil methyl ester (RME) were compared. In addition to the activation coefficient $\gamma$ for the BTX components, table 1 also shows the heat capacity $c_p$ in J/gK (joule per grams Kelvin), and the density in kg/l (kilograms per liter) for wash oil and RME, each at 30° C.

TABLE 1

|  | Wash oil | RME |
|---|---|---|
| γ benzene (30° C.) | 1.7 | 0.6 |
| γ toluene (30° C.) | 2.7 | 0.7 |
| γm xylene (30° C.) | 4.6 | 2.4 |
| $C_p$ [J/gk] | 1.7 | 2.2 |
| P [kg/l] | 1.07 | 0.88 |

For benzene, toluene and xylene a lower activity coefficient is observed for RME, than for wash oil, and therefore an improved absorption capacity at 30° C. With an increase of the temperature the values of the activity coefficient approximate a value of 1, wherein RME always has a better absorption capacity than the conventional wash oil. Furthermore, RME advantageously has a higher heat capacity and a lower density than black coal-tar wash oil. While fresh RME has a lower viscosity than wash oil, the values of the viscosities in a cyclic use of the wash liquid and a repeated stripping of the dissolved aromatic hydrocarbons by heating are approximately the same. The rapeseed oil methyl ester also has a sufficient temperature resistance. The highest temperatures are achieved in the cycle for BTX washing during the stripping of the aromatic hydrocarbons by hot water vapor. There is no decomposition of the biodiesel when adding vapor at a temperature of 235° C. Furthermore, any losses by evaporation as compared to wash oil are also negligibly low. Merely a certain brightening of the biodiesel is observed with a longer lasting use of RME, which is due to the disappearance of a low portion of slightly boiling components. Coagulation and flocculation were not observed such that biodiesel is therefore suitable for long term use for the absorption of aromatic hydrocarbons from coke-oven gas.

The invention claimed is:

1. A method of removing aromatic hydrocarbons from coke oven gas, which comprises the steps of:
   (a) scrubbing the coke oven gas with a wash liquid comprising biodiesel in a gas scrubber to absorb the aromatic hydrocarbons from the coke oven gas thereby obtaining a wash liquid comprising biodiesel enriched with aromatic hydrocarbons, and removing the wash liquid comprising biodiesel enriched with absorbed aromatic hydrocarbons from the coke oven gas in the gas scrubber;
   (b) heating the wash liquid comprising biodiesel enriched with absorbed aromatic hydrocarbons to a temperature of between 100 and 250° C., and stripping the aromatic hydrocarbons from the wash liquid comprising biodiesel enriched with aromatic hydrocarbons with water vapor; and
   (c) following step (b) cooling the wash liquid comprising biodiesel stripped of the aromatic hydrocarbons and returning the wash liquid comprising biodiesel stripped of the aromatic hydrocarbons to the gas scrubber according to step (a).

2. The method defined in claim 1 wherein according to step (a) the biodiesel in the wash liquid consists essentially of rapeseed oil methyl ester.

3. The method defined in claim 1 wherein according to step (a) the biodiesel is added at the top of the gas scrubber and flows through the gas scrubber countercurrent to the coke-oven gas, and the biodiesel enriched with aromatic hydrocarbons is removed from a lower area of the gas scrubber.

4. The method defined in claim 1 wherein according to step (b) the biodiesel is stripped of the absorbed aromatic hydrocarbons using superheated water vapor that has a temperature of more than 150° C.

5. The method defined in claim 1 wherein according to step (a) the biodiesel is added to the gas scrubber at a temperature of between 10° C. and 50° C.

6. The method defined in claim 5 wherein the biodiesel is fed to the gas scrubber at a temperature of between 20° C. and 40° C.

* * * * *